March 15, 1932.  E. F. BRITTEN, JR  1,849,448
REGISTERING MECHANISM
Filed Feb. 2, 1929  6 Sheets-Sheet 1

Inventor
E. F. Britten, Jr.,
by E. W. Anderson
Attorney

March 15, 1932. E. F. BRITTEN, JR 1,849,448
REGISTERING MECHANISM
Filed Feb. 2, 1929 6 Sheets-Sheet 4

Inventor
E. F. Britten. Jr.,
by E. W. Anderson
Attorney.

March 15, 1932.  E. F. BRITTEN, JR  1,849,448
REGISTERING MECHANISM
Filed Feb. 2, 1929   6 Sheets-Sheet 5

Inventor
E. F. Britten Jr.,
by E. W. Anderson
Attorneys.

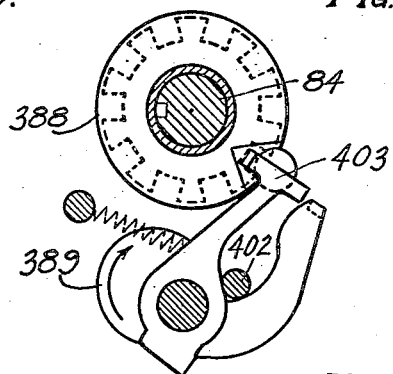
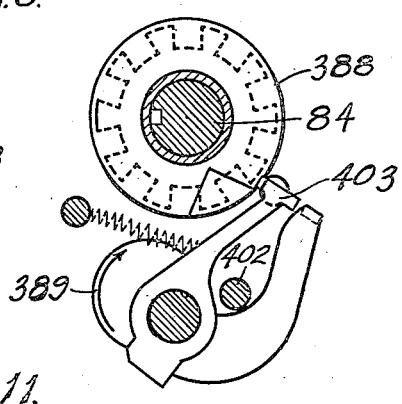
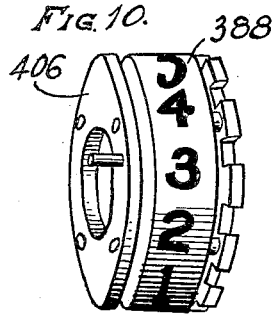
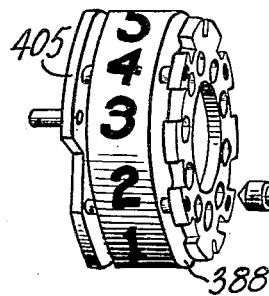
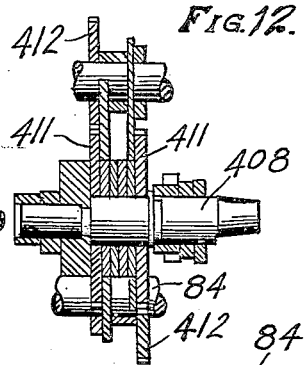
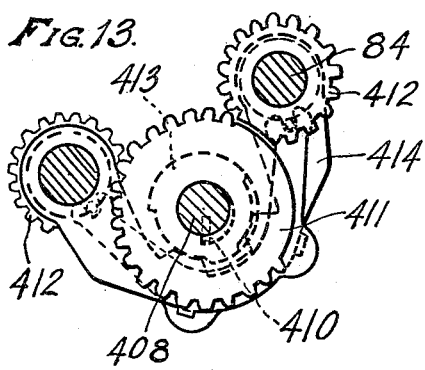
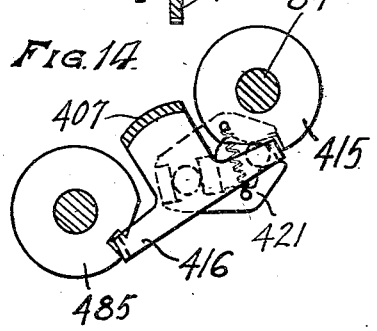

Patented Mar. 15, 1932

1,849,448

UNITED STATES PATENT OFFICE

EDWIN F. BRITTEN, JR., OF MAPLEWOOD, NEW JERSEY, ASSIGNOR TO MONROE CALCULATING MACHINE COMPANY, OF ORANGE, NEW JERSEY, A CORPORATION OF DELAWARE

REGISTERING MECHANISM

Application filed February 2, 1929. Serial No. 337,073.

The invention relates to improvements in registering mechanism for calculating machines, and more particularly to means for clearing one or more sets of registers, or one or more groups of register wheels selectively by a single operation.

The invention consists in the novel construction and combination of parts, as set forth in the appended claims.

In the accompanying drawings, illustrating the invention:

Fig. 8 is a detail side elevation showing a carry finger engaged with a counting wheel gear.

Fig. 9 is a similar view showing the finger held out of the gear by the notched disc.

Fig. 10 is a detail perspective view of a counting wheel equipped with an un-notched disc.

Fig. 11 is a similar view of a counting wheel equipped with a notched disc.

Fig. 12 is a detail section of the means for rotating the differential registration wheel and the revolution counting wheel shafts.

Fig. 13 is a side elevation of the same.

Fig. 14 is a side elevation of the means for rocking the clearing bar.

In these drawings, the invention is shown as applied to a calculating machine constructed in accordance with the disclosure of Patent Number 1,396,612, issued to Nelson White, November 8, 1921, and of Patent 1,566,650, issued to George C. Chase, December 22, 1925.

Figure 1:
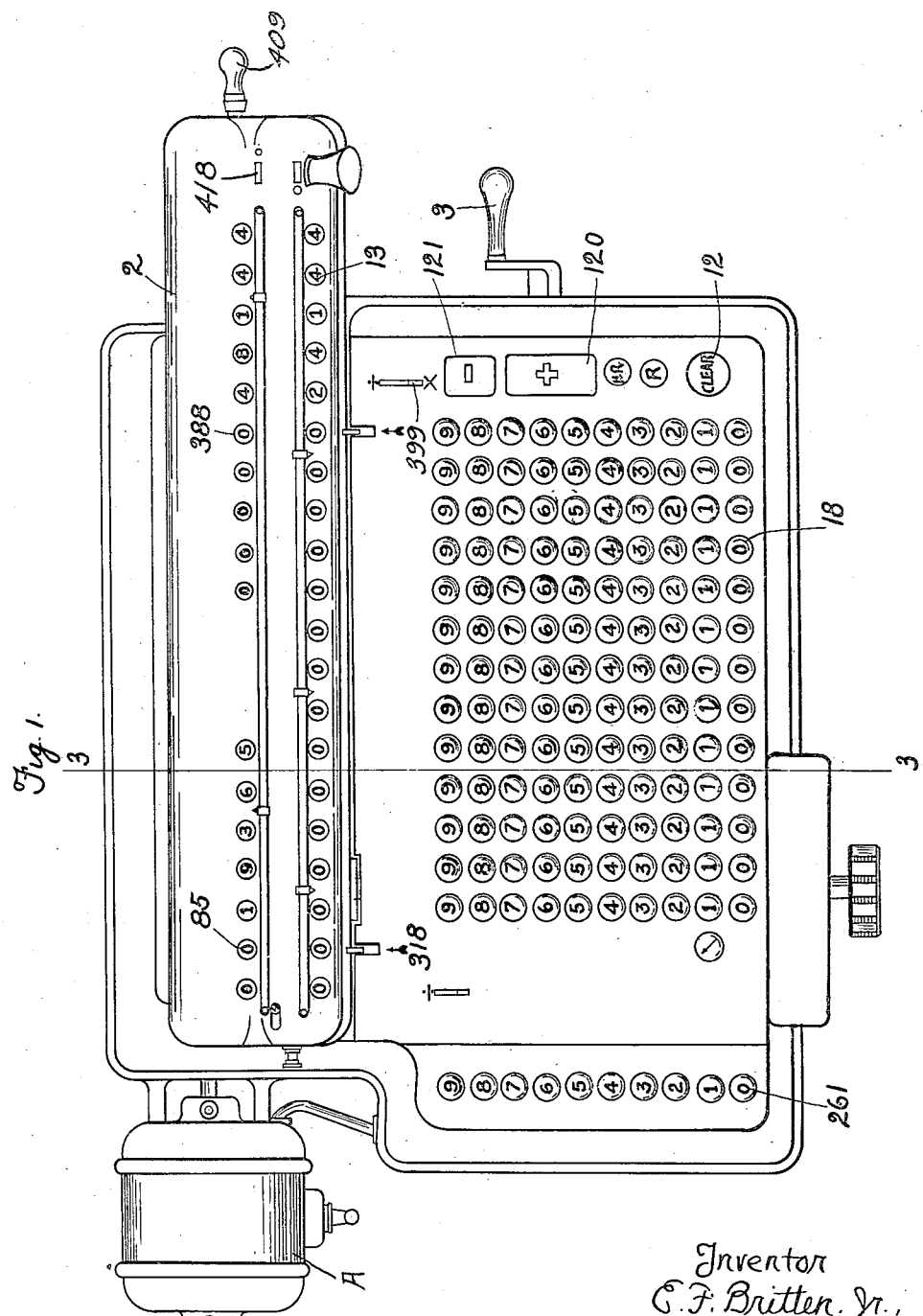
Fig. 1 is plan view of a calculating machine embodying the present invention.
Figure 2:
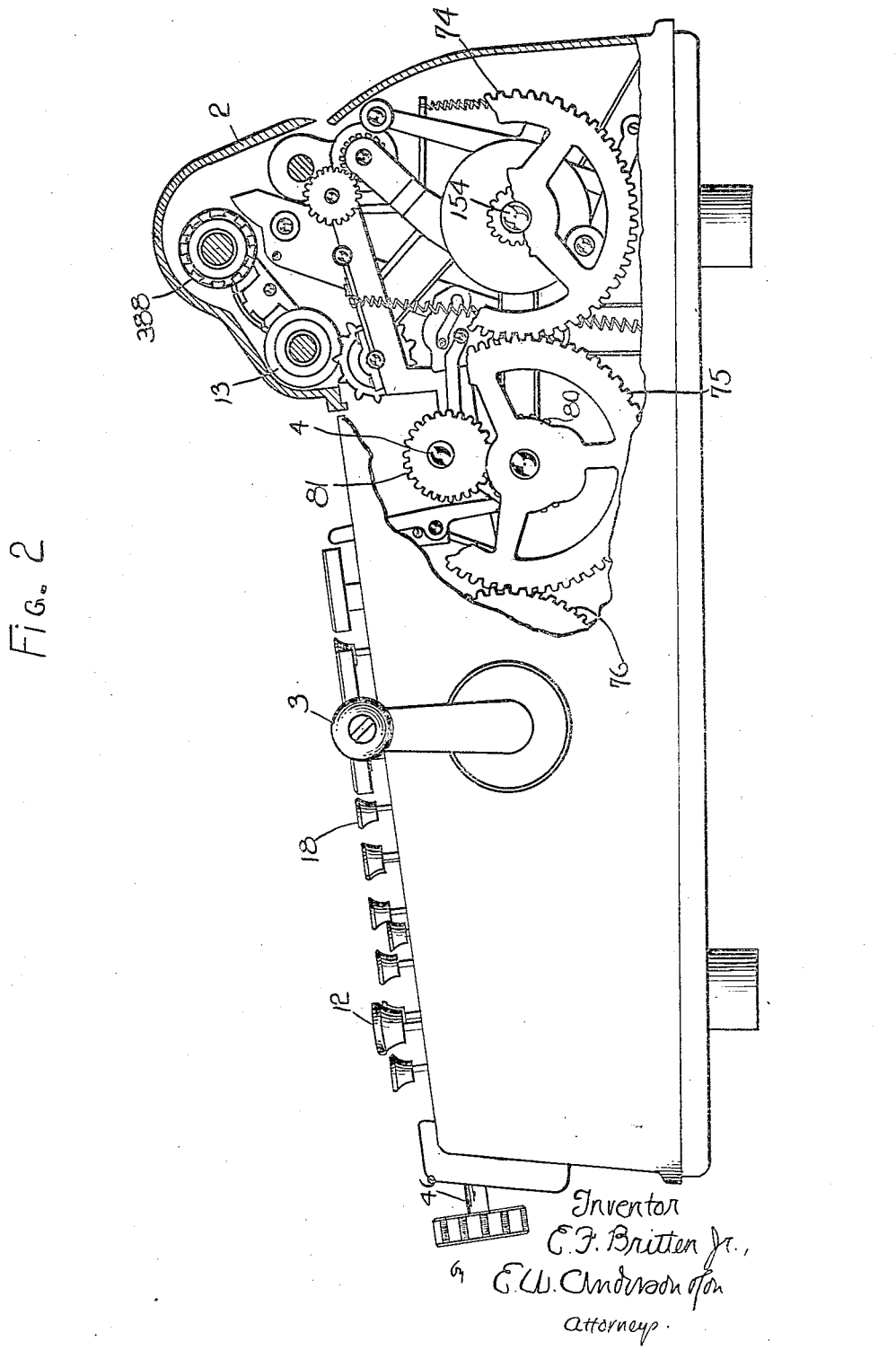
Fig. 2 is a side elevation of the same with the casing partly broken away.
Figure 3:
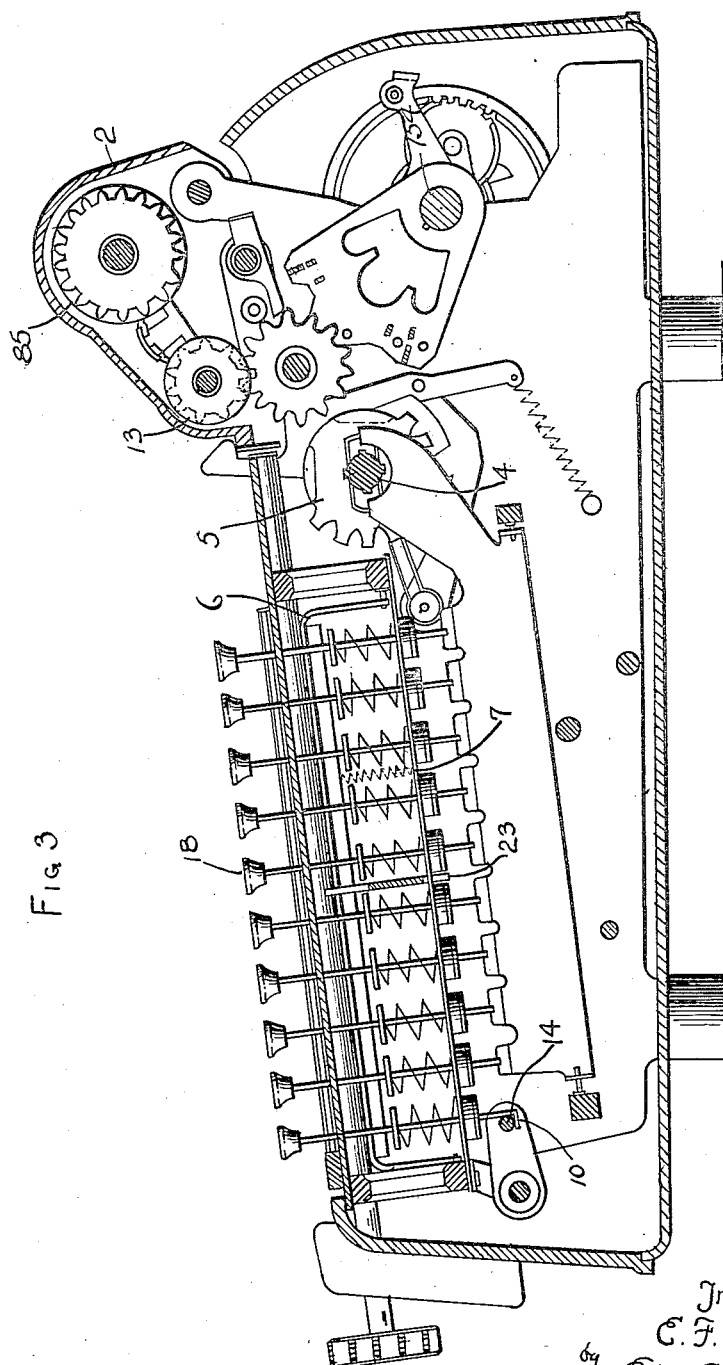
Fig. 3 is a section of the machine taken on line 3—3, Fig. 1.

*Selecting and actuating means. Figs. 1–3*

According to the present disclosure, and as fully set forth in the patents above referred to, amounts set up on the keyboard 18, and thereby on the differential actuating gears 5, (Fig. 3) are registered upon differential registration wheels 13 by the operation of differential gear shaft 4 and of shaft 154, whereon the tens-carry members are mounted, these shafts being connected by 1 to 1 ratio gears 74, 75 and elliptic gears 80, 81 (Fig. 2). Power is derived from motor A for rotating this mechanism, but a hand crank 3, operating a gear 76, meshing with gear 75, may be retained as an alternative means of operation.

The differential registration wheels 13 are mounted in a transversely shiftable carriage 2, wherein are also mounted revolution counting wheels 85 and 388 hereinafter more fully described, said carriage being employed in the well-known manner in performing operations in multiplication and division.

Figure 4:
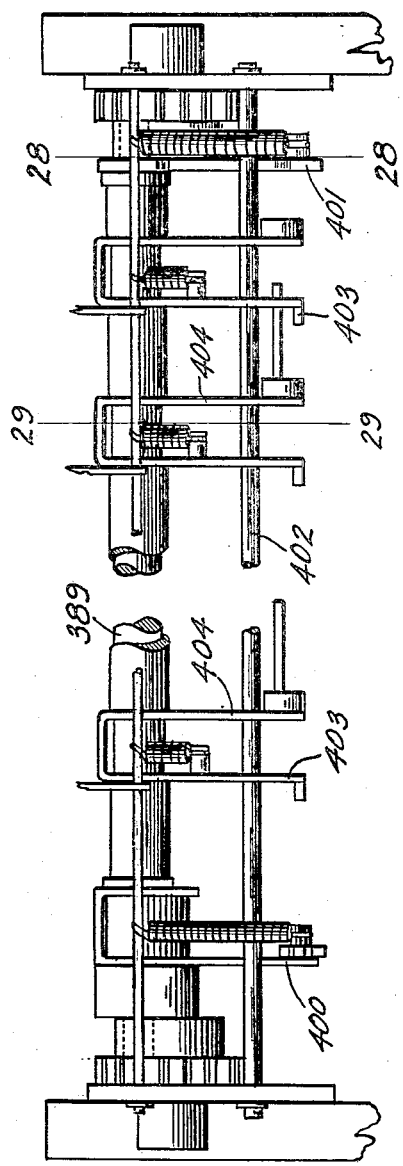
Fig. 4 is a plan view of the revolution counting mechanism.
Figure 5:
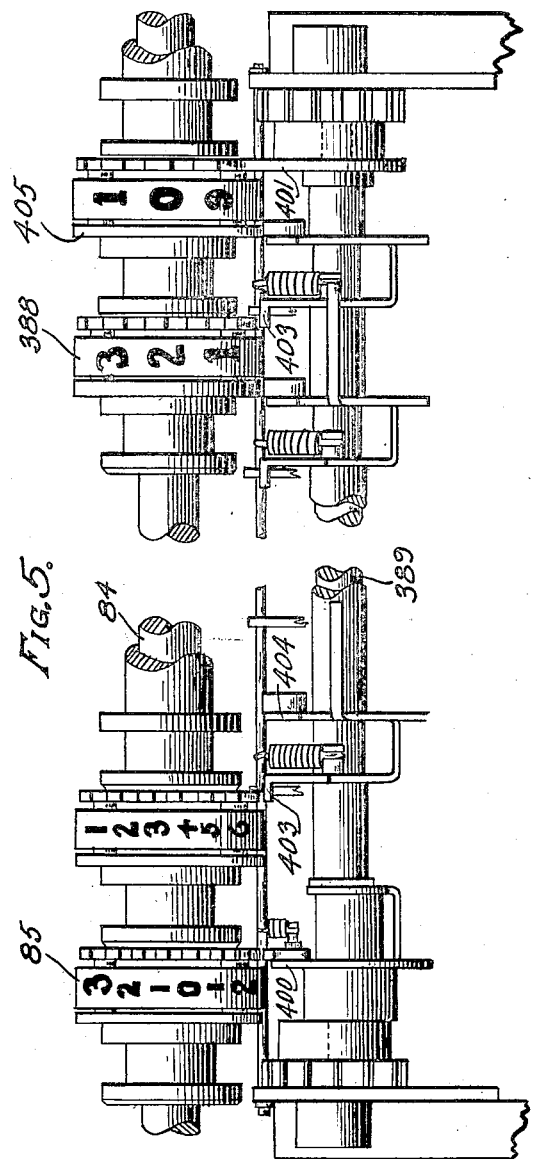
Fig. 5 is a front elevation of the same.
Figure 6:
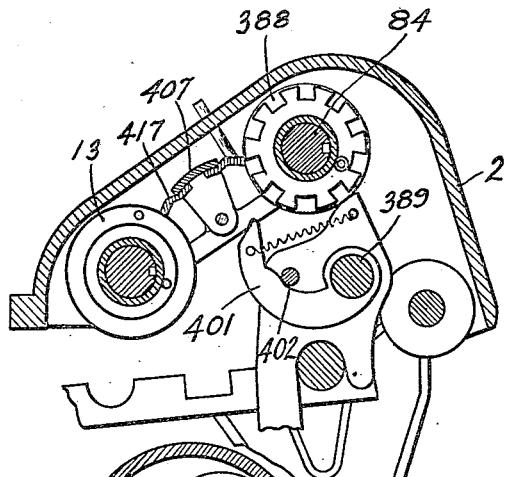
Fig. 6 is a detail section taken on the line 28—28, Fig. 4.

*Registering mechanism. Figs. 4–5*

According to the present invention, two distinct series of revolution counting wheels are provided, the two series 85 and 388, being shown as mounted upon a common supporting shaft 84, (Figs. 4 and 5). The wheels 85 are marked each with two series of digits progressing from one to nine in opposite directions from a common "0" designation. It will thus be apparent that when a calculation is begun with these wheels standing at zero, they will register additively in either direction of movement of the driving mechanism. The wheels 388 are marked with a single series of digits and the character "0", and are thus capable of registering additively or subtractively, according to the direction of rotation of the driving mechanism.

As shown, the wheels 85 and 388 are mounted on the same shaft and are of the same diameter. Since, however, there are nineteen figures on each of the wheels 85 and only ten figures on each of the wheels 388, a magnifying lens (not shown) is preferably mounted in the sight opening through which the registrations upon the wheels 85 are read.

Shaft 389 is eccentrically mounted in the framing of the machine and is provided with driving pawls 400 and 401 for the wheels 85 and 388 respectively. These pawls are loosely mounted on the eccentric or cranked shaft 389 and are held by suitable springs toward the gears of the counting wheels, being restrained and guided by engagement with a fixed rod 402. By this means the driving ends of the pawls 400—401, are given an approximately rectangular movement into and out of mesh with the gears of the counting wheels, serving to give them a one-step movement in one or in the other direction.

Figure 7:
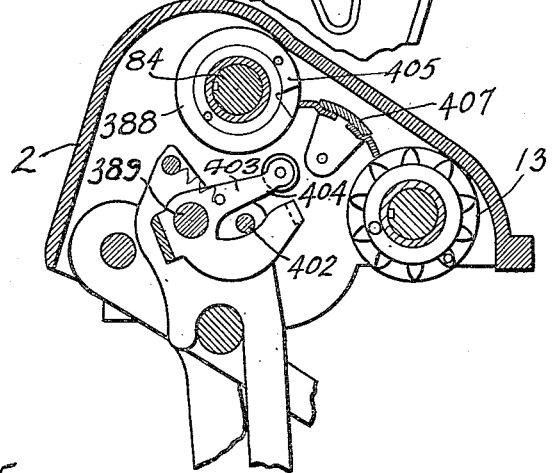
Fig. 7 is a similar view taken on line 29—29 Fig. 4.

The series of counting wheels 388 is provided with decimal carry means, comprising a series of pawls 403 (Figs. 7 to 9), similar to the pawls 400, 401, being provided with arms 404 having rollers adapted to ride upon the periphery of a notched disk 405 attached to the wheel 388 of lower order. By this means, when a tens carry should occur the roller of arm 404 falls into disk 405 of the lower-order wheel and the driving end of pawl 403 engages the gear of the higher-order wheel to accomplish the carry. In case the number of counting wheels 85 and 388 provided is sufficient to bring the two series of wheels into proximity, the tens carry is stopped at the end of the series 388. This is accomplished by substituting for the notched disk 405 (Fig. 11) of the left-hand wheel 388, an un-notched disk 406, (Fig. 10) which will prevent a pawl 403 from acting upon the lowest-order wheel of the series 85.

The wheels 13, 85, and 388 are set to zero registering position by means of a rock bar 407 located between and parallel to the differential registration and the counting wheels and provided with a series of lateral projections normally located out of the path of movement of suitable pins of the respective wheels. Bar 407 may be rocked to one side, or to the other, to bring the projections within the path of movement of the pins of the differential registration wheels or the counting wheels. While the bar 407 is held in rocked position, the shaft 84, or differential registration wheel shaft as the case may be, is rotated, carrying around the wheels mounted thereon by frictional engagement. During this movement, the pins of the wheels strike the projection of bar 407 and the series of wheels are brought into alignment with the "0" opposite the sight-opening.

This operation is performed by the following mechanism:

A clearing shaft 408 (Figs. 12 and 13), connected with clearing handle 409, has a one-way driving connection 410 with gears 411 adapted to mesh with gears 412 on the shaft 84 and the differential registration shaft respectively. Cams 413 and arms 414 serve to lock the gears 412 and to release the same during the time they are being rotated. The shaft 84 and the differential registration shaft are provided with cams 415 (Fig. 14) adapted to engage arms 416 of the rock bar 407, in order to throw said bar toward the related wheels which are to be cleared. Spring-tension means 421 serve to return the bar 407 to centralized position.

It is provided that the wheels 85 and the wheels 388 may be cleared independently of each other and that the right-hand wheels of the series 13 and the left-hand wheels of said series may also be cleared independently of each other. For this purpose, the projections of the rock bar 407, above referred to are formed upon slide plates 417 (Figs. 15 and 16) fixed upon said bar, and lever means 418 are provided for shifting these slide plates into or out of registering position with the pins of the numeral wheels.

Figure 15:
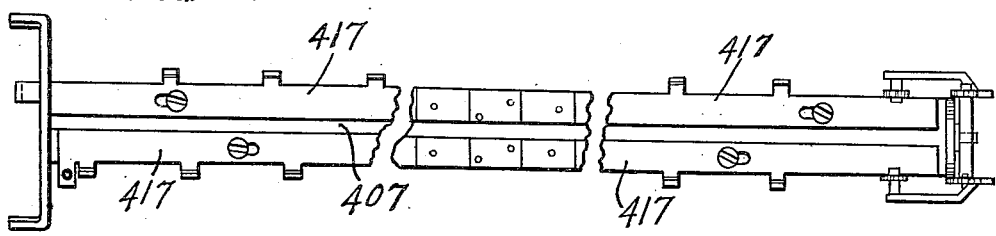
Fig. 15 is a bottom plan view of the clearing bar.
Figure 16:
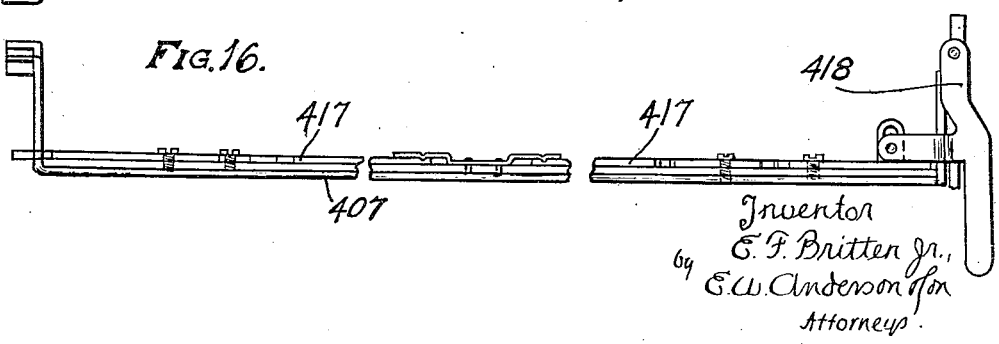
Fig. 16 is a side elevation of the same.

As will be seen from an inspection of Figures 15, 16, lever 418 is fulcrumed to a frame member of carriage 2, and not to the rock bar 407, said lever being connected to the slide plates 417 by pin and slot connections. Thus, lever 418 will not be displaced by the rocking movement of bar 407.

I claim:

1. In a calculating machine having a plurality of registering wheels provided with projections, and clearing means including friction devices for rotating said wheels and a reciprocatory member movable toward and away from said wheels; a slide mounted on said reciprocatory member and provided with teeth, and a lever fulcrumed in fixed relation to said wheels and having operative engagement with said slide, to adjust the teeth into or out of the plane of movement of the numeral wheel projections.

2. In a calculating machine having a frame, a shaft mounted therein, numeral wheels on said shaft and provided with projections, and clearing means including friction devices for rotating said wheels and a bail rockable toward and away from said wheels: a slide mounted on said bail and provided with teeth, and a lever fulcrumed on said frame and having operative pin and slot connection with said slide, to adjust the teeth into or out of the plane of movement of the numeral wheel projections.

In testimony whereof I affix my signature.

EDWIN F. BRITTEN, Jr.